US007004389B1

(12) United States Patent
Robinson et al.

(10) Patent No.: US 7,004,389 B1
(45) Date of Patent: Feb. 28, 2006

(54) SYSTEM AND METHOD FOR TRACKING A MOBILE WORKER

(75) Inventors: Timothy L. Robinson, Reston, VA (US); Bradford R. Schildt, Boulder, CO (US); Tennille V. Goff, Springfield, VA (US); Daniel J. Corwin, Ashburn, VA (US); Timothy Neil Watson, Alexandria, VA (US)

(73) Assignee: BioPay, LLC, Herndon, VA (US)

( * ) Notice: Subject to any disclaimer, the term of this patent is extended or adjusted under 35 U.S.C. 154(b) by 0 days.

(21) Appl. No.: 11/034,055

(22) Filed: Jan. 13, 2005

(51) Int. Cl.
*G06K 5/00* (2006.01)

(52) U.S. Cl. ............... 235/382; 235/487; 235/375; 235/383

(58) Field of Classification Search ........ 235/382–383, 235/375, 487, 385, 472.02; 705/8–9, 22
See application file for complete search history.

(56) References Cited

U.S. PATENT DOCUMENTS

| | | | |
|---|---|---|---|
| 4,195,220 A | 3/1980 | Bristol et al. | |
| 4,952,928 A | 8/1990 | Carroll et al. | |
| 5,204,670 A | 4/1993 | Stinton | |
| 5,493,492 A | 2/1996 | Cramer et al. | |
| 5,606,497 A | 2/1997 | Cramer et al. | |
| 5,646,839 A | 7/1997 | Katz | |
| 5,805,719 A | 9/1998 | Pare et al. | |
| 5,877,953 A | 3/1999 | Clendenen et al. | |
| 5,909,672 A | 6/1999 | Madore et al. | |
| 5,991,742 A | 11/1999 | Tran | |
| 6,154,727 A | 11/2000 | Karp et al. | |
| 6,185,683 B1 | 2/2001 | Ginter et al. | |
| 6,300,873 B1 | 10/2001 | Kucharczyk et al. | |
| 6,570,488 B1 | 5/2003 | Kucharczyk et al. | |
| 6,581,025 B1 | 6/2003 | Lehman et al. | |
| 6,591,242 B1 | 7/2003 | Karp et al. | |
| 6,595,342 B1 | 7/2003 | Maritzen et al. | |
| 6,690,997 B1 | 2/2004 | Rivalto | |
| 6,696,918 B1 | 2/2004 | Kucharczyk et al. | |
| 6,758,394 B1 * | 7/2004 | Maskatiya et al. | 235/379 |
| 6,764,013 B1 * | 7/2004 | Ben-Aissa | 235/472.01 |
| 6,789,045 B1 | 9/2004 | Lehman | |
| 6,791,450 B1 | 9/2004 | Gokcebay et al. | |
| 6,802,005 B1 | 10/2004 | Berson | |
| 2001/0042032 A1 | 11/2001 | Crawshaw et al. | |
| 2002/0013739 A1 | 1/2002 | O'Donnell et al. | |
| 2002/0030582 A1 | 3/2002 | Depp et al. | |
| 2002/0030584 A1 | 3/2002 | Perler et al. | |
| 2002/0035515 A1 | 3/2002 | Moreno | |
| 2002/0067261 A1 | 6/2002 | Kucharczyk et al. | |
| 2002/0069031 A1 | 6/2002 | Lehman | |

(Continued)

FOREIGN PATENT DOCUMENTS

WO    WO 03/75227 A1    9/2003

OTHER PUBLICATIONS

Symbol Technologies. New Biometrics Company Bio4 and Symbol Join Forces for Innovative Security (http://www.symbol.com/uk/News/uk_pr_2001-01-10.html). Oct. 2001.

(Continued)

*Primary Examiner*—Thien M. Le
*Assistant Examiner*—Edwyn Labaze
(74) *Attorney, Agent, or Firm*—Duane S. Kobayashi (57) ABSTRACT

A system and method of providing employers with an accessible system and convenient method for tracking the work of mobile workers. By obtaining customer biometric data upon the initiation and conclusion of a work session, an employer may ensure that a customer is billed for an appropriate amount of time.

32 Claims, 2 Drawing Sheets

U.S. PATENT DOCUMENTS

| | | |
|---|---|---|
| 2002/0077841 A1 | 6/2002 | Thompson |
| 2002/0083022 A1 | 6/2002 | Algazi |
| 2002/0091537 A1 | 7/2002 | Algazi |
| 2002/0103653 A1 | 8/2002 | Huxter |
| 2002/0103724 A1 | 8/2002 | Huxter |
| 2002/0107820 A1 | 8/2002 | Huxter |
| 2002/0116185 A1 | 8/2002 | Cooper et al. |
| 2002/0156645 A1 | 10/2002 | Hansen |
| 2002/0175211 A1 * | 11/2002 | Dominquez et al. ........ 235/492 |
| 2003/0050732 A1 | 3/2003 | Rivalto |
| 2003/0093298 A1 | 5/2003 | Hernandez et al. |
| 2003/0161503 A1 * | 8/2003 | Kramer ..................... 382/115 |
| 2003/0169230 A1 | 9/2003 | DeVito |
| 2003/0182081 A1 | 9/2003 | Lehman |
| 2003/0195717 A1 | 10/2003 | Lehman |
| 2003/0197055 A1 | 10/2003 | Ben-Aissa |
| 2003/0197593 A1 | 10/2003 | Siegel et al. |
| 2004/0014479 A1 | 1/2004 | Milman |
| 2004/0059923 A1 | 3/2004 | ShamRao |
| 2004/0062421 A1 | 4/2004 | Jakubowski et al. |
| 2004/0064453 A1 | 4/2004 | Ruiz et al. |
| 2004/0066276 A1 | 4/2004 | Gile et al. |
| 2004/0083371 A1 | 4/2004 | Algazi et al. |
| 2004/0149820 A1 * | 8/2004 | Zuili ......................... 235/384 |
| 2004/0185875 A1 | 9/2004 | Diacakis et al. |
| 2004/0202292 A1 | 10/2004 | Cook |
| 2004/0243431 A1 | 12/2004 | Katz |
| 2004/0267595 A1 * | 12/2004 | Woodings et al. ............. 705/9 |
| 2005/0021428 A1 | 1/2005 | Costello |

OTHER PUBLICATIONS

Edward Hasbrouck. Transportation Worker Identification Credential (TWIC) (http://hasbrouck.org/blog/archives/000189.html). Apr. 2004.

Transportation Security Administration Industry Partners: Credentialing (http://www.tsa.gov/public/display?theme=68).

Bill Spence. Payroll Accuracy: Biometrics Make the Dream a Reality (http://www.paypunch.com/paypunch_articles_recogsys.asp).

* cited by examiner

SYSTEM AND METHOD FOR TRACKING A MOBILE WORKER

FIELD OF THE INVENTION

This application relates generally to a system and method for tracking mobile workers by means of a biometric authorization system. More particularly, the present invention relates to a system and method for tracking mobile workers and validating work sessions through the receipt of customer biometric data.

BACKGROUND OF THE INVENTION

Generally, employers have difficulty monitoring the activities of mobile workers, such as homecare workers, service workers, and the like, because they are not under direct supervision. Mobile workers may attempt to defraud their employers and/or their customers by reporting services that were not performed or hours that were not worked. Often an employer has no method to ensure that mobile workers actually complete the work they report. Conversely, unscrupulous customers may attempt to defraud employers and mobile workers by claiming that a mobile worker did not work for the hours reported. The employer or mobile worker may not be able to validate the legitimacy of the labor, and thus may concede to the fraudulent customer. What is needed is a better system and method for monitoring mobile workers and validating the labor and services they provide.

SUMMARY OF THE INVENTION

The present invention addresses the aforementioned needs by providing employers with an accessible system and convenient method for tracking the work of mobile workers. By obtaining customer biometric data upon the initiation and conclusion of a work session, an employer may ensure that a customer is billed for an appropriate amount of time.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As aforementioned, the present invention provides a system and method for tracking mobile workers by receiving customer biometric data during a work session. A mobile worker may be any worker that operates at customer locations. For example, a maid may provide services to a customer at the customer's house. A mobile worker may provide reoccurring service or may provide service as needed, such as a plumber or cable company worker. Mobile workers may report to an employer who assigns work sessions and bills customers for work performed. Alternatively, a mobile worker may work directly for a customer. In such a scenario, the customer would serve as the mobile worker's employer. The invention described herein uses the terms "employer," "mobile worker," and "customer"; however these terms are utilized to ease understanding of the invention and should not be considering limiting of its scope.

As mentioned, employers often have no method to ensure that mobile workers are honestly reporting their hours and/or services provided. Mobile workers are often paid by the hour and, therefore, an accurate accounting of worked hours is of critical importance to the employer. An unscrupulous mobile worker may attempt to defraud an employer by reporting that he worked longer than he did. For example, a cable company worker may complete an installation in thirty minutes but may report that the process took an hour and an half, thereby defrauding the employer of an extra hour of pay.

Attempts have been made to monitor mobile workers by placing tracking equipment in their vehicles. However, these devices are easily overcome by dishonest workers. For example, an employer may install a locating device in a plumber's van to verify that he is at the assigned worksite. However, the plumber may park his van outside the customer location and leave, perhaps to a nearby drinking establishment. The plumber may then report that he was at the customer location the entire time. Additionally, mobile workers may tamper with such tracking devices so that they do not transmit information properly, thereby defeating their purpose.

Additionally, because mobile workers typically do not have a means of registering time at customer locations, confusion regarding the actual start and finish time of a work session may arise. For example, an elderly woman may pay a homecare worker to clean her house weekly. The mobile worker may spend the first fifteen minutes of her weekly visit chatting with the customer. The customer may assume that this friendly discussion is simply a social situation, but the mobile worker may include this time in her billable hours. Such an arrangement lacks a method to clarify to the mobile worker and the customer when a work session has begun and ended.

Conversely, a dishonest customer may attempt to pay for less time than a worker actually worked. For example, a painter may spend a total of twelve hours painting a customer's room. However, the customer may refuse to pay for twelve hours of work. He may be dishonest or simply may not be aware of the actual time spent completing the work assignment. Without a verifiable method of tracking time, an employer may have to concede to the customer's demands and thus receive pay that is significantly less than what is actually due.

In order to overcome such problems, an employer may insist that mobile workers receive customer signatures or initials at the completion of a work assignment. However, such methods are far from fraud-proof. Unless the customer carefully reads invoice documentation, he may be unaware that he has signed off on more hours than those that were worked. Moreover, a mobile worker may forge a customer's signature in order to receive payment for fraudulent hours. Conversely, a dishonest customer who knowingly signed off on the mobile worker's hours may accuse the worker of forgery and refuse to pay.

By employing a biometric authorization system (BAS), the present invention may overcome the aforementioned shortcomings. When a mobile worker arrives at a customer location, the customer may authorize the initiation of a work session by supplying biometric data. The customer's biometric data may be collected at various types of biometric input devices (BIDs) known in the art. The BID may be a static device housed at the customer location. For example, a customer may have a BID attached to a personal computer or a BID mounted at an access point. Alternatively, the BID may be portable, such as, for example, a mobile phone with an integrated BID. The BID may be issued by the employer, may be supplied by the BAS, or may be a device owned by the customer or mobile worker.

By receiving customer biometric data, the mobile worker may receive authorization to begin a work session. The time of the receipt of the biometric data may be recorded in the system. Once the mobile worker has completed a work session, the customer may again provide biometric data to authorize a mobile worker to cease work. The time of the second biometric data collection may be recorded as well, thereby providing an employer with an accurate account of a mobile worker's hours. In one embodiment, the mobile worker may provide biometric data in addition to the customer.

As a further step to prevent fraudulent behavior, the BAS may employ the received biometric data for biometric authorization. The received customer biometric data may be compared against registered biometric data stored in the BAS. A positive match would indicate that the mobile worker has received the appropriate customer's biometric data. A negative match may indicate fraudulent behavior. This authorization would ensure that the mobile worker obtains the customer's biometric data and not that of an accomplice. Alternatively, the system may compare customer biometric data received at work initiation to customer biometric data received at work conclusion.

The BAS may account for a multiple customer scenario by accepting more than one customer's biometric data. For example, either a husband or wife may be allowed to authorize work session initiation and/or conclusion. Additionally, if the system obtains mobile worker biometric data, a select group of mobile workers may be allowed to provide their biometric data at work session initiations and/or conclusions. Biometric data may be received by the BAS from a variety of sources, such as from an individual directly or from a third-party source, such as a database, token, or the like.

In the context of the present invention, a mobile worker or customer may be considered a user depending upon a particular circumstance. A user is an individual or entity that may utilize the BAS in some fashion. For example, a mobile worker may be a user when providing his biometric data in order to verify the receipt of customer data. Likewise, a customer may be a user when providing biometric data to authorize a worker to start and/or finish a work session. Biometric data received from a user may be gathered for work session verification or may be employed to authorize the user biometrically.

An employer may be considered an operator in the system. An operator is an entity that has administrative capabilities in the BAS. For example, an employer may utilize the BAS to assign a work session to a mobile worker or to verify a customer to validate work session data.

In general, a biometric authorization refers to an authorization in which a user provides biometric data to be matched against a biometric record in a database. For example, a user may undergo biometric authorization to complete a financial transaction or to gain access to an age-restricted location. As would be appreciated, the location of the database as well as the specific mechanism by which the biometric data is matched to a particular biometric record would be implementation dependent and would not limit the scope of the present invention. Thus, in a biometric authorization, the biometric data taken during the authorization can be matched against registered biometric data at a location where the registered biometric data is stored or where the authorization biometric data is gathered. In addition, biometric data received during an authorization may be tested for liveness to prevent system fraud. Alternatively, the BAS may provide non-biometric access for users who have nonviable biometric data or for users who wish to employ the BAS without the use of biometric data.

Depending on the embodiment, the BAS may also provide a registered user with a user identifier, such as a system identification number (SID). A user identifier may serve as a pointer that can be used with or without biometric data to aid the system in locating the storage location of a user record. Depending on the embodiment of the system, a user identifier may also serve as a user group identifier that identifies a user as an affiliate of a specified group of users.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template may be a mathematical representation of more than one biometric. For example, a user template may be generated from biometric data acquired from two individual fingers, such as a thumb and index finger, or from a finger and an iris scan. The biometric data may include fingerprint data, iris data, facial data, voice data, retinal data, hand architecture data, DNA data, or any other physical measurement pertaining to a user's person.

Figure 1:
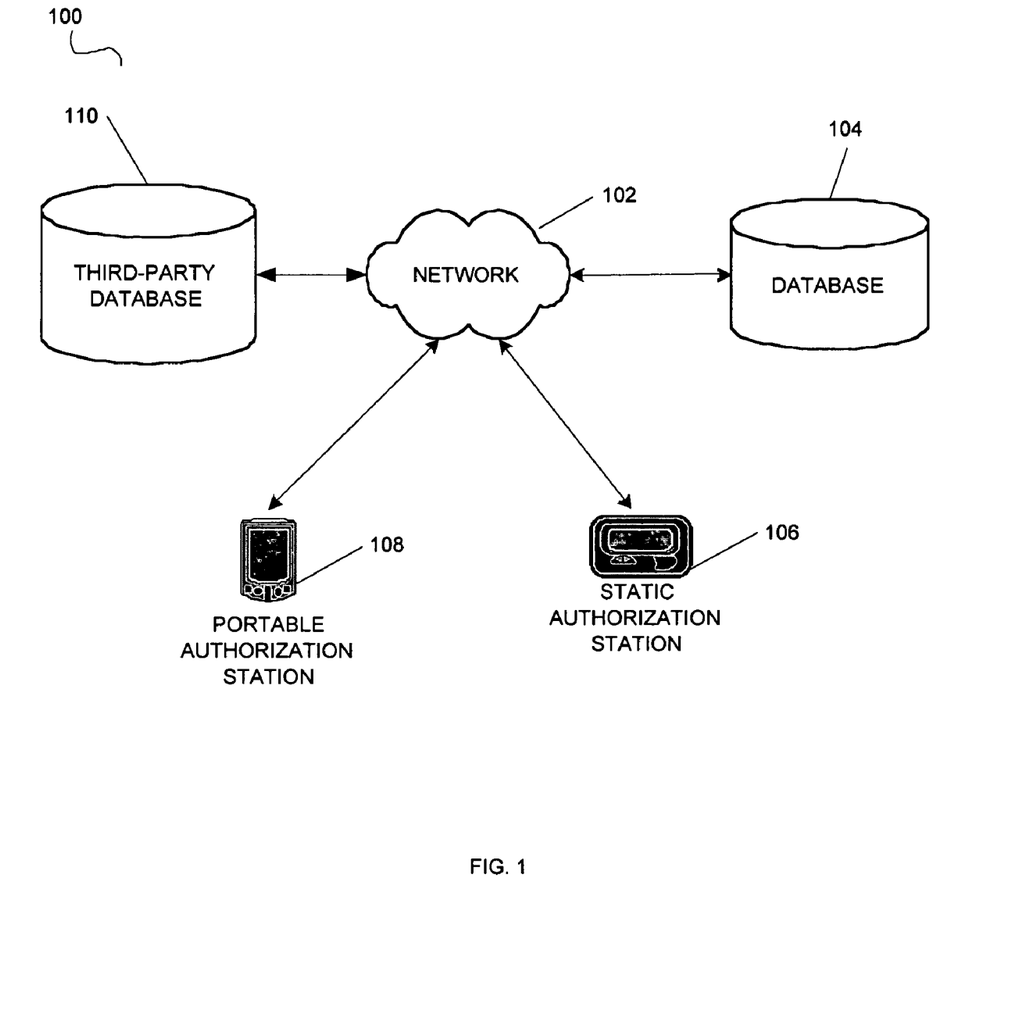
FIG. 1 illustrates a general architecture overview of a biometric authorization system.

FIG. 1 illustrates a general architecture overview of BAS 100. As will be described in detail below, BAS 100 enables an effective method by which an employer may monitor mobile workers and accurately track their labor and services. User information is stored in database 104 where user records are stored. Database 104 may represent one or more databases utilized within the system. In one embodiment, database 104 is a central database to which all user records are stored and from which user records are accessed for biometric authorization. In another embodiment, database 104 also includes one or more operator databases to which a select set of operator records are stored and from which a select set of operator records are accessed for biometric authorization. In an additional embodiment, BAS 100 may also utilize a combination of central databases and one or more operator databases. In general, embodiments utilizing a combination of databases enable increased control of information flow throughout BAS 100. As described in detail below, various examples of information flow configurations within the system can include "open," "closed," and "selectively shared" system models. In still further embodiments, database 104 can further comprise one or more sub-databases that are contained within a particular database. In such embodiments, user data, operator data, and other system data may be distributed across multiple databases within database 104.

A user record holds user biometric information and other identity verifying information related to an individual seeking biometric authorization within the system. The information held in such a record may include, by way of illustration and without limitation, a user's government identification number(s) and corresponding state(s) of issue, home address, email address, a telephone number, and at least one biometric record. When enrolling in BAS 100, a user may present any number of identity verifying documents or testaments to his identity depending on the implementation of the biometric system. By way of illustration and not of limitation, examples of such documents or testaments include a financial token, a digital image, a video clip, family information, or a DNA sample. Depending on the particular implementation, a user record can also hold financial account information and/or a user identifier, such as an SID.

An operator record holds information useful for authenticating an operator, such as a name or ID number, device ID numbers associated with the operator, an address, and a phone number. In one embodiment, operator records hold an operator identifier, such as an SID and/or operator biometric data. In one scenario, an operator may need to undergo biometric authorization before conducting administrative activities.

In addition to users and operators, agents of BAS 100 may have access to BAS functions and/or records. An agent may be an employee of BAS 100 capable of monitoring and assisting with operation of BAS 100 functions. For example, an agent may access user records in order to verify user and operator registration data or administer BAS 100 maintenance procedures.

Database 104 and third-party database 110 are connected to network 102, which may be, but is not limited to, the Internet. Networks used in additional embodiments include local area networks (LANs), wide area networks (WANs), and telephone networks. Network 102 comprises connections to at least one authorization station (AS) where a user may be biometrically authorized. An AS includes at least one biometric input device (BID) and the necessary means for sending and receiving information to and from a user and to and from a database. These stations include but are not limited to a vending machine, a kiosk, a personal computer, a user service desk, a point of sale terminal, a telephone, or a wireless device connected via a wireless network. An AS BID may be a peripheral device or an integrated BID. In one embodiment, an AS may simply be a BID connected to BAS 100.

Portable AS 108 and static AS 106 are AS embodiments that may be employed by the system to receive customer biometric data and/or mobile worker biometric data for the purpose of user enrollment and work session authorization. The particular form and execution of portable AS 108 and static AS 106 would be implementation dependent. For example, portable AS 108 may be a specialized apparatus designed specifically for mobile worker use or it may be an existing device, such as a pager, equipped with a BID. Static AS 106 may be a BID mounted at the customer location for the sole purpose of mobile worker authorization or may be a BID attached to a personal computer and may perform a variety of functions. In one scenario, static AS 106 may be a biometric access device, and may allow an authorized mobile worker entry to a customer location without the customer present.

An AS may be equipped with one or more additional data input devices. Depending upon the embodiment, an AS may receive a variety of enrollment, authorization, and/or work session information. For example, an AS may have an alphanumeric pad to allow for the entry of letters and/or numbers. Additionally, an AS may be equipped with a display able to present messages to the customer and/or the worker. Such additional features may allow for greater functionality. The display may prompt a customer or worker to employ the keypad for various functions. For example, a mobile worker may press "1" to start a work session, "2" to pause a work session, or "3" to conclude a work session. As another illustration, portable AS 108 may be a cell phone capable of capturing digital images. During enrollment, portable AS 108 may capture a user's photograph or video clip in addition to other biometric data. Likewise, a mobile worker may receive a video and/or audio recording of a customer testimonial during work session initiation or conclusion, wherein customers acknowledge their approval of the work performed.

Additionally, the AS may serve as a communication device between the employer and a worker. The employer and worker may communicate verbally or via a display on the AS. For example, an employer may issue work assignments or request the status of a work session and a mobile worker may request help or authorization for overtime.

A mobile worker or work session may be identified by a unique or non-unique work session identifier. The work session identifier may be associated with an AS, such as an identification number, or may be associated with a particular work session, such as a work order number. The work session identifier may associate a particular worker with a specific AS and the worker may be accountable for any work recorded on the AS. The work session identifier may be used in conjunction with or in place of worker biometric authorization. For example, a worker identifier may serve as a mobile worker's user identifier when accessing the BAS. Additionally, a worker's location may be tracked by the work session identifier. For example, the system may be able to determine that a mobile worker was at the Smith residence at 12:00 P.M. because the system received biometric data from the Smith AS (recognized by its identifier) at that time.

A locating mechanism may allow an employer to track a mobile worker's location via portable AS 108 to prevent fraud. For example, portable AS 108 may be equipped with a global positioning system (GPS) transmitter/receiver. Alternatively, portable AS 108 may provide location information via a service, such as location triangulation. Various locating devices, networks, and services exist in the art that may be applicable mechanisms for mobile worker tracking. If portable AS 108 is small, such as a pager or cell phone, the worker may keep the device on his person during the workday so that his whereabouts may be monitored. This may provide an employer with a method to ensure that a mobile worker remains at the job site. The employer or the system may query portable AS 108 throughout the day (randomly or on a schedule) to determine the worker's location. Additionally, the locating mechanism of portable AS 108 might help a worker find a customer location.

The AS may be equipped with a timing indicator that alerts the mobile worker and/or customer when a scheduled amount of time has expired. The AS may alert the customer and/or worker periodically as work session time passes or that the assigned work session is nearing completion. For example, a health care worker's time might be bought in hour increments. When an hour is over, the AS may sound an alarm (e.g., if it is a cell phone, it might ring) notifying both the worker and customer that they have completed their hour. Additionally, the AS may alert the worker and/or customer of certain events. For example, the AS may notify the customer and worker that the time limit for the work session has been reached and that the mobile worker is now working overtime (and that the customer may be charged accordingly). The AS might contain the mobile worker's schedule and allow a customer to purchase additional time based upon the worker's availability.

Additional embodiments of the system also comprise connections to one or more third party sources in which user information, including user biometric data, is verified and/or from which user information is retrieved. In an additional embodiment, the system may be connected to one or more financial sources in order to facilitate financial biometric authorizations. For example, a user record stored at database 104 may indicate an account held at a financial institution that is to be debited during a biometrically authorized purchase.

Information transferred in the system may be encrypted. For example, information may be encrypted at one point and sent across a non-secure connection between points or not encrypted at a point of communication and sent to the other point of communication across a secure connection. Encryption and decryption of these messages may be monitored by services provided by a security company such as VeriSign. In one scenario, as an added level of security, information internal to a terminal and which is never transmitted may also be encrypted. This prevents retrieval of sensitive information (e.g., biometric data) from a stolen terminal. In an additional embodiment, the system incorporates one or more anti-tampering methods by which to recognize authentic and non-authentic system requests.

In one embodiment, the system is configured as an "open" system, where all information entered into the system is transmitted to and stored in database 104. An open system allows authorization at any AS in the system because an open system shares user information stored in database 104 with all stations.

In an alternate embodiment, the system is configured as a "closed" system, where information entered into the system via a specific operator device is transmitted to and stored in database 104 specific to that operator, and this information is not shared with another AS or other databases. This is referred to as a "closed" system because users need to enroll in the database in which they would like to perform system functions. Database 104 in closed systems may communicate with other databases, such as a third-party database 110. However, all user information that is enrolled into a particular database is stored in that database. In an alternate embodiment of the closed system, information is stored in a partitioned database 104. Operator related information is stored in operator-specific partitions and is closed to all other operators. Only an authorized operator and authorized entities, such as agents, may access that partition of database 104. In yet an additional embodiment, information stored in one database or database partition may be stored in another database or database partition. Such an embodiment is useful for information protection in the event database information is lost.

In a further embodiment of the present invention, user information is "selectively shared" and stored in select system multiple-operator databases or select system multiple-operator partitions within database 104. In this embodiment, a group of operators share data with each other and they can choose whether to share system information with other operators within the system. Such a system is referred to as a "selectively shared" system. This system allows a chain of operators owned by the same entity or linked in some other manner to share user information amongst them without sharing that information with all other non-designated operators registered in the system. Information in such a system may be shared between one or more databases freely or sharing may be monitored by rules set in the one these databases or a combination thereof. By way of illustration and not as a limitation, one operator might only want to share user information with one of five operators or not all operators might want to send or store user information to database 104. Such a system allows operators greater control over information flow while still allowing various user conveniences, such as being able to undergo biometric authorization at any store in a selectively shared chain.

The configuration of the system as an "open" system, "closed" system, or "selectively shared" system illustrates various ways of implementing the principles of the present invention. System configuration might be determined by the system in which user information is used.

Figure 2:
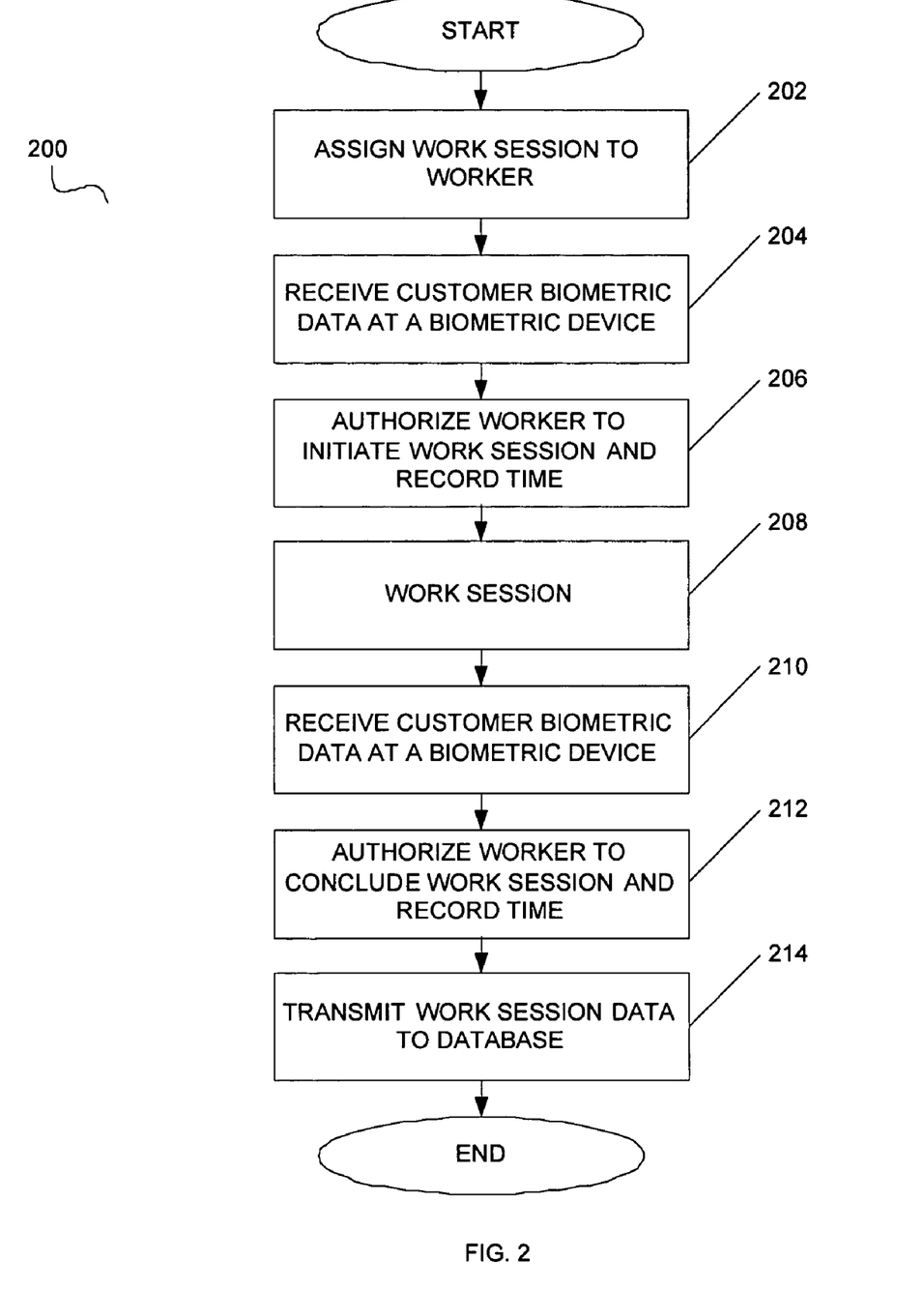
FIG. 2 illustrates a flowchart of a process for authorizing a work session of a mobile worker by receiving customer biometric data.

FIG. 2 illustrates a flowchart of a process for authorizing a work session of a mobile worker by receiving customer biometric data. At step 202, a work session is assigned to a mobile worker. The assigned work session may be classified by a work session identifier, such as an order number. The method of worker session assignment may be determined by implementation. For example, an employer may verbally inform a mobile worker of an assignment, either in person or over a phone. In one scenario, portable AS 108 may enable the employer to transmit work assignment information to a mobile worker via a wireless network. For example, portable AS 108 may be a personal digital assistant (PDA) equipped with a BID. The PDA may maintain a schedule of a mobile worker's assignments, which may be modified by the employer from a remote location.

At step 204, after the mobile worker has arrived at the customer location, BAS 100 receives customer biometric data via portable AS 108 or static AS 106. In one embodiment, the mobile worker may have a limited time frame in which to obtain customer biometric data, thus ensuring the mobile worker arrives at the customer location in a timely manner. For example, if the work session to begin at 8:00 A.M., the mobile worker may only be able to obtain customer biometric data between 7:50 A.M. and 8:10 A.M.

At step 206, the system authorizes the mobile worker to initiate the work session and records the time of the initiation. The system may also receive an identifier from the customer or mobile worker to assist with authorization, such as a user identifier or a work session identifier. In one embodiment, the receipt of customer biometric data may meet authorization parameters and allow the mobile worker to begin work. In another embodiment, the customer may undergo biometric authorization, wherein received customer biometric data may be compared with registered customer biometric data. A successful match may authorize a worker to begin. In one scenario, prior to authorization, the AS may present an authorization message to the customer, for example, "I approve John Smith to install a cable television in my house." By supplying biometric data, the user may be agreeing to the authorization message.

A customer who is not enrolled may register biometric data in the system via portable AS 108, static AS 106, or at another variation of an AS. Enrollment may occur prior to the particular work session or may occur during the work session. For example, a customer may place a work order request via an employer's web site. The employer may request a customer who is not enrolled to register with BAS 100. If the customer has a BID linked to his personal computer, he may register while placing the work order. If the customer does not have access to a BID, the employer may inform the customer that he will be enrolled in BAS 100 at the beginning of the ordered work session.

As previously mentioned, biometric data from one of a group of multiple customers may be acceptable for authorization. For example, a married couple may have hired a contractor to install kitchen cabinets. The contractor may obtain biometric data from either the husband or the wife to authorize work sessions. In one scenario, the mobile worker or customer may have to specify which person is providing biometric data. For example, a display on an AS may state "Press 1 for Mr. Smith or Press 2 for Mrs. Smith."

In one embodiment, BAS 100 may also obtain mobile worker biometric data at step 204. The system may store mobile worker biometric data and/or may employ mobile worker biometric data to authorize the worker biometrically. Obtaining mobile worker biometric data in addition to customer biometric data may further prevent fraudulent activity, such as a mobile worker subletting his work to another individual. Mobile worker biometric authorization may provide an additional safeguard by ensuring that a worker is who he claims to be. In one scenario, if mobile worker biometric authorization is unsuccessful, BAS 100 may enact a safeguard procedure, such as notifying the customer, the police, or the like. If multiple mobile workers are assigned to the same work session, biometric data from anyone of the group may be sufficient for work session authorization. Alternatively, the biometric data of a particular worker, such as a supervisor, may be needed.

The system may allow for customers and/or mobile workers to provide various biometrics for work session authorization. The system may accept any biometric data as long as it can verify that it is from the appropriate individual. The mobile worker or customer may have to specify to the AS which biometric is provided to assist the system with processing. For example, the system may allow a customer to provide his right index finger at work session initiation and his left index finger at work session conclusion.

At step 208, the mobile worker session transpires. The present invention may be utilized in a variety of scenarios and for a wide range of occupational fields. Such occupational fields include, but are not limited to, legal service, homecare service, repair service, home improvement service, healthcare service, and the like. The service provided may be a one-time assignment or part of a multiple session assignment. Alternatively, the work assignment may be an ongoing event, such as a maid's weekly house cleaning.

At step 210, BAS 100 again receives customer biometric data via portable AS 108 or static AS 106. At step 212, the system authorizes the mobile worker to conclude the work session and records the time of the conclusion. The system may also receive an identifier from the customer or mobile worker to assist with authorization, such as a user identifier or a work session identifier. In one embodiment, the receipt of customer biometric data may meet authorization parameters and allow the mobile worker to cease work. In another embodiment, the customer may undergo biometric authorization, wherein received customer biometric data may be compared with registered customer biometric data. A successful match may authorize a worker to stop. In a multiple customer scenario, customer biometric data received at step 210 may be deemed acceptable for authorization as long as it matches the biometric data of one of a group of registered authorized customers.

By providing biometric data at the conclusion of a work session, a customer may be agreeing that the work was done to his satisfaction. Alternatively, customers may denote their approval by selecting an option from another interface on the AS, such as hitting a "Yes" button. In one embodiment, the AS may be equipped to allow a customer to provide a gratuity to the mobile worker. Additionally, the customer may agree to be listed as a reference for the mobile worker. For example, customer references may be included in work session data, which may later be uploaded to an employer's web site to encourage other individuals to employ his service. Alternatively, the AS may allow for customer surveys, providing a means for obtaining customer feedback regarding a mobile worker's performance.

In one embodiment, customer biometric data received at step 204 may be compared to customer biometric data received at step 210. A positive match would indicate the same person who authorized the work session initiation also authorized its conclusion. Such a comparison may be an additional security measure for embodiments in which customer biometric data is not compared with registered customer biometric data.

Mobile worker biometric data also may be obtained at step 210. Mobile worker biometric data may be compared with registered data or may be compared with mobile worker biometric data received at work session initiation.

At step 214, work session data may be transmitted to database 104. Work session data may include a work session identifier, a user identifier, customer biometric data, the time of work initiation, the time of work conclusion, and the like. Data transmission may occur in a variety of methods, such as via a hardwired connection or by wireless means, and may occur as an automatic process, at an employer's request, or at the mobile worker's initiation. The time of data transmission may vary by implementation. For example, data transmission may occur immediately after receiving work conclusion authorization or may transpire on a periodic basis, such as at the end of a workweek. The AS may not have a connection to database 104 at all times and may store authorizations for later transmission. Data transmission may be accomplished anywhere that network 102 can reach, for example via a wireless network or the Internet. In one scenario, a mobile worker may deposit portable AS 108 at a docking station at an employer location, allowing database 104 to download work session data. In another scenario, work session data may be transmitted from a remote location.

Work session data may be utilized by the employer to calculate a mobile worker's billable hours. As aforementioned, BAS 100 maintains a record of the time of work session initiation and work session completion. Additionally, the work session data may provide data regarding the type of service, product or labor provided, and the appropriate pay rate for the time worked. For example, work session data may denote that a mobile worker worked for eight hours at normal pay rate and two hours at an overtime rate. If work session data is transmitted in a batch, it may, for example, indicate that, during a workweek, a mobile worker worked for 30 hours at the standard rate, 5 hours at the overtime rate, and 10 hours at a holiday rate. This record may provide the employer with an accurate account of time worked and may allow for validation of such time. For example, if a customer argues that he did not authorize the time for which he was billed, the employer may request the customer undergo biometric authorization to verify the work session length. The customer biometric data received during the work session may be compared to biometric data received from the customer during billing negotiations. If the biometric data matches, the employer has proof that the customer did authorize the work session. If the biometric comparison generates a negative match, then a mobile worker may have attempted to defraud the system. Similar steps may be employed to resolve payroll issues with mobile workers.

To prevent a mobile worker from attempting to defraud the system with the aid of an accomplice (e.g., having a friend provide biometric data instead of the customer), the system may compare the biometric data received from the current job with that of the previous one. In this scenario, the biometric data obtained at the pervious work session may be considered registered biometric data. If the worker is at a new customer location, then the biometric data should not match. Alternatively, for a repeat business situation, matching biometric data may signify legitimate behavior. A worker that returns to the same location on a regular basis would be expected to receive the same biometric data each time. For example, a physical therapist would receive the same patient's biometric data at each visit.

As another measure to lessen the risk of mobile worker fraud, an employer may contact customers to ensure that the worker obtained the correct biometric data (i.e., not an accomplice's biometric data). An employer may confirm the work with the customer verbally or may capture customer biometric data to compare it with the biometric data acquired on the workday in question. These inspections may occur randomly or at an employer's initiation.

If a customer has a financial account associated with BAS 100, the customer may biometrically authorize a financial payment for a work session. This authorization may occur when the customer provides biometric data at the conclusion of a work session.

BAS 100 may allow a customer to approve additional service, labor, or products from a mobile worker by providing input, such as biometric data, to an AS. This embodiment ensures the system has a record of any extra service performed and prevents a mobile worker from fraudulently reporting extra work. This approval may be conducted via portable AS 108 or static AS 106. For example, a homecare worker may be originally authorized to work for two hours at a customer location. A customer may desire the worker stay for additional hour to provide further service. By supplying biometric data again, the customer may authorize this extra service. In one scenario, the AS may present a message to the customer to confirm the additional service, for example, "I approve Joan Jones to work an additional hour." The authorization may be based upon customer biometric authorization. A mobile worker may provide biometric data as well. Additionally, a customer may approve the purchase of goods offered by a mobile worker. For example, a contractor installing kitchen cabinets for a customer may offer to install a new countertop as well. The customer may provide biometric data to approve the purchase of any additional materials.

In an additional embodiment, a mobile worker and/or a customer may have to provide biometric data each time the worker leaves the customer location or pauses work. The system may maintain a record of the time for each biometric collection and the employer may use this record to monitor worker activity. This may allow employers and customers to ensure mobile workers are taking approved breaks and not leaving customer locations for unsanctioned activities.

A system and method of tracking mobile workers and validating work sessions through the receipt of customer biometric data has been illustrated. It will be appreciated by those skilled in the art that the system and method of the present invention can be used to track the work of mobile workers via a biometric authorization system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

The invention claimed is:

1. A method for establishing a record of time via a biometric authorization system, said method comprising:
   assigning a work session to a worker;
   at a portable authorization station, receiving customer biometric data to authorize a worker to initiate said work session;
   comparing customer biometric data received at said initiation to registered customer biometric data, wherein if the result of said comparison is positive said initiation is authorized and the time of said initiation is recorded;
   at said portable authorization station, receiving customer biometric data to authorize a worker to conclude said work session;
   comparing customer biometric data received at said conclusion to registered customer biometric data, wherein if the result of said comparison is positive said conclusion is authorized and the time of said conclusion is recorded; and
   transmitting work session data to a database.

2. The method of claim 1, wherein said work session is ordered by said customer.

3. The method of claim 1, wherein said portable authorization station is one of a mobile phone, a pager, or a personal digital assistant.

4. The method of claim 1, wherein said portable authorization station is equipped for location tracking.

5. The method of claim 1, further comprising enrolling a customer in said biometric authorization system wherein said enrolling occurs at one of a time prior to said initiation or a time during said initiation.

6. The method of claim 1, further comprising receiving a user identifier.

7. The method of claim 1, wherein said customer biometric data is tested for liveness.

8. The method of claim 1, wherein customer biometric data is from a token.

9. The method of claim 1, wherein said comparing transpires at said portable authorization station.

10. The method of claim 1, wherein said comparing transpires at a database.

11. The method of claim 1, wherein said authorization station is equipped to handle a non-biometric identifier.

12. The method of claim 1, further comprising authorizing payment using customer biometric data.

13. A method for establishing a record of time via a biometric authorization system, said method comprising:
- at an authorization station, receiving customer biometric data to authorize a worker to initiate a work session;
- recording the time of said initiation;
- at said authorization station, receiving customer biometric data to authorize a worker to conclude said work session; and
- recording the time of said conclusion.

14. The method of claim 13, wherein said customer biometric data is received from one of a plurality of customers allowed to authorize said work session.

15. The method of claim 13, wherein said authorization station is portable.

16. The method of claim 13, wherein said authorization station records the location of said receiving.

17. The method of claim 16, wherein said location is compared with a scheduled location.

18. The method of claim 17, wherein said scheduled location is determined using a work session identifier.

19. The method of claim 17, further comprising marking said work session data for further action if said works session location does not match said scheduled location.

20. The method of claim 13, wherein said authorization station is equipped with a timing indicator that alerts a worker of a time-related event.

21. The method of claim 13, wherein said authorization station provides a worker with access to his work schedule.

22. The method of claim 13, further comprising comparing said received customer biometric data to registered customer biometric data.

23. The method of claim 13, wherein customer biometric data received at said initiation is compared to customer biometric data received at said conclusion and if said initiation biometric data does not match said conclusion biometric data, marking said work session data for further action.

24. The method of claim 13, further comprising receiving worker biometric data.

25. The method of claim 13, further comprising receiving customer biometric data at said authorization station as authorization for one or more of an additional service, product, and labor.

26. The method of claim 13, further comprising transmitting work session data to a database.

27. The method of claim 26, wherein said transmitting occurs at a time subsequent to said work session.

28. The method of claim 13, further comprising authorizing payment using customer biometric data.

29. A method for establishing a record of time via a biometric authorization system, comprising:
- displaying, on a portable biometric authorization device, information relating to a work session to be performed by a worker;
- receiving first customer biometric data on said portable biometric authorization device at an initiation of said work session, said first customer biometric data providing a customer approval for said work session; and
- at a time subsequent to said initiation of said work session, receiving second customer biometric data on said portable biometric authorization device, said second customer biometric data providing a customer approval for a time spent by said worker on said work session.

30. The method of claim 29, further comprising recording a time of receipt of customer biometric data.

31. The method of claim 29, further comprising comparing said first customer biometric data to registered customer biometric data.

32. The method of claim 29, further comprising comparing said second customer biometric data to said first customer biometric data.

* * * * *